Oct. 17, 1939.  L. H. KIRK ET AL  2,176,590
OPHTHALMIC MOUNTING FOR RIMLESS SPECTACLES OR EYEGLASSES
Filed Dec. 17, 1937

Inventors:
Lloyd H. Kirk and
Charles Plouffe
Attorneys.

Patented Oct. 17, 1939

2,176,590

UNITED STATES PATENT OFFICE 2,176,590

OPHTHALMIC MOUNTING FOR RIMLESS SPECTACLES OR EYEGLASSES

Lloyd H. Kirk, Cranston, and Charles Plouffe, Providence, R. I., assignors to Martin-Copeland Company, Providence, R. I., a trusteeship composed of Edgar W. Martin, E. Cornell Martin, and Laurence C. Martin Application December 17, 1937, Serial No. 180,348

4 Claims. (Cl. 88—41)

This invention relates to ophthalmic mountings and particularly to an improved mounting or frame for rimless spectacles and eyeglasses.

One object of the invention is to provide a frame or mounting for supporting a pair of lenses in such manner as to be capable of flexing or yielding without danger of breaking the lenses.

Another object of the invention is to provide a mounting of the type indicated having means for attaching each lens thereto at a single point to adapt the frame or mounting to flex without danger of breaking the lenses.

Another object of the invention is to provide a mounting of the type indicated which may be readily adapted to fit lenses of different shapes such as those having a circular, oval or polygonal contour at their edges.

Another object of the invention is to provide a mounting of the type indicated which is capable of flexing under strain from the canting of the temples or other parts with the lenses attached thereto in such manner as to prevent them from becoming broken when the frame flexes.

Another object of the invention is to provide a mounting of the type indicated which is simple in construction, economical to manufacture, and durable under severe usage.

Further objects of the invention are set forth in the following specification which describes a preferred form of construction of the improved mounting as illustrated by the accompanying drawing. In the drawing.

Figure 3:
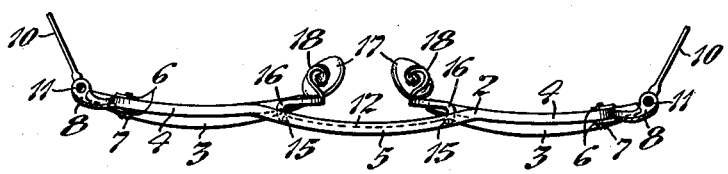
Fig. 3 is a top plan view of the mounting.

Referring to the drawing, the present improved mounting comprises a substantially flat resilient bar or spring-element 2 adapted to be shaped to the contour of the edges of the lenses 3 to cause it to lie across the upper edges thereof in contact therewith. Referring particularly to Fig. 3 of the drawing, the spring-bar or frame-member 2 has its opposite end portions 4 curved arcuately or slightly bowed toward the front to adapt them to conform to the concavo-convex shape of the lenses 3. The intermediate portion 5 of the bar 2 is also bowed or curved toward the front so that it will clear the forehead of the wearer.

Figure 1:
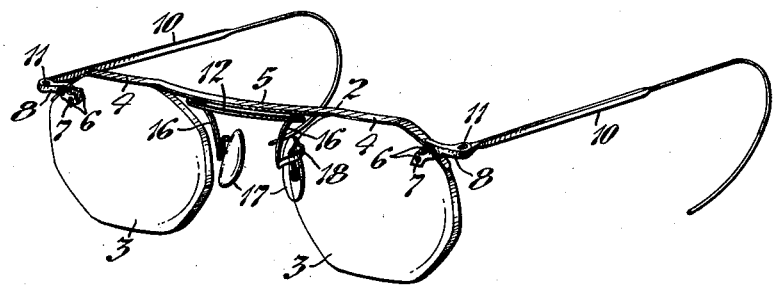
Fig. 1 is a perspective view of a pair of spectacles embodying the present improved mounting.
Figure 2:
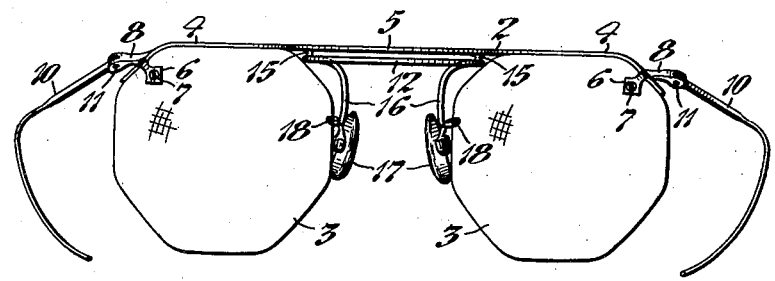
Fig. 2 is a front view of the same.
Figure 4:
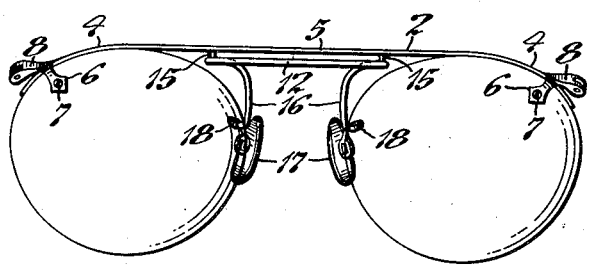
Fig. 4 is a view similar to Fig. 2 showing the frame adapted for mounting lenses of generally circular shape in outline.

As shown in Figs. 1 to 3, inclusive, the mounting is in a form to adapt it for use with lenses of polygonal or octagonal shape in outline. In other instances, however, it may be shaped to fit the edges of circular or oval lenses by bending its ends to conform thereto as illustrated in Fig. 4. At either end of the frame-member 2 opposed straps 6 are provided for straddling the sides of the lens, the straps being pierced with apertures for receiving a screw 7 or other fastening means passing through a hole in the lens. Usually, the screw 7 passes freely through the aperture in the forward strap and is threaded into the hole in the rearward strap so that by screwing it thereinto the straps are secured tight against the opposite faces of the lens. In the embodiment of the invention as herein shown bifurcated lugs or ears 8 project from the ends of the member 2 adjacent the straps 6, being formed to receive the ends of the temples 10 which are hinged thereto in the usual manner by means of screws 11.

A bridge-member 12 is connected to the central portion of the bar 2 extending parallel therewith at a slight distance therebelow. The bridge-member 12 is preferably of the same thickness as, but narrower than, the main frame-member or spring-bar 2 and is shaped arcuately or bowed forwardly to conform to the contour of that portion of the bar which it underlies. The bridge-member 12 is connected to the underside of the bar 2 by any suitable means such as the struts or spacers 15, shown most clearly in Fig. 2.

The ends of the bridge-member 12 are continued in curved arms 16 which extend downwardly to support a pair of nose-pads 17 at their ends. Preferably, the terminal portions of the arms 16 are curled around in loops 18, as shown in Fig. 3, and the nose-pads 17 are connected therewith by any suitable means such as that shown in United States Letters Patent No. 2,068,273, issued January 19, 1937. The loops 18 in the arms 16 provide for bending the ends of the arms to fit the pads 17 to the nose of the wearer.

It is to be particularly noted that each lens 3 is attached to the frame-member or bar 2 at one point only, that is, outwardly thereof near the terminal portion of the bar and adjacent the point where the temple is connected thereto. This provides that when the temple is swung on its pivot or hinge if it is canted or rocked upwardly or downwardly it will have a tendency to flex the frame-member 2 without causing fracture of the lens at the screw hole. Stated more specifically, the end of the frame-member or bar 2 will flex or yield in such manner that the lens 3 will move either laterally with respect to the bar 2 or be canted downwardly from contact with a portion thereof so that little or no strain will be placed on the glass lens to cause breakage thereof.

In previously used spectacle frames where the lenses are attached or held at two or more points any flexing or bending of the frame under pressure or strain on the temples acts to cant the lenses and for this reason the straps or attaching means are caused to break the edge of the lenses at the holes where the screws are inserted. With the present improved form of construction, however, the frame-member or crossbar 2 may be flexed in several directions under a twisting or canting action of the temples without straining the attaching means and causing fracture of the lenses at the screw holes. On the other hand, since the frame-member or spring-bar lies across the top edges of the lenses with its terminal portions following the downward line or contour thereof the lenses are normally maintained bearing against the bar to position them in proper relationship to be worn.

As another advantage of the present improved form of construction the frame is adapted to be fitted to lenses of various shapes and sizes by simply bending the ends of its crossbar to conform to the contour of the edges of the lenses. This fitting may be made by the optometrist or optician so that the mounting has practically universal application for all types of spectacles or eyeglasses.

As still another advantage, the bridge-member 12 being located adjacent the frame-member or bar 2 provides that the pad-supporting arms 16 may be made of considerable length so as to insure maximum resiliency whereof to yieldingly press the pads against the wearer's nose with a firm, yet velvety, action.

It will be observed from the foregoing that the present invention provides an improved structure of ophthalmic mounting comprising a resilient frame to which the lenses may be attached with one screw hole only in each lens while supporting them in the proper relationship. Moreover, as above explained, the lenses are fastened to the frame in such manner that the latter may flex when the temples are rocked or canted so as to prevent putting strain on the lenses liable to fracture or break the same. Moreover, due to the resilient character of the frame and the manner of mounting the lenses thereon the lenses are cushioned against shock when the spectacles or eyeglasses are dropped on the floor or inadvertently struck against some object. The invention further provides a spectacle or eyeglass mounting which may be constructed more economically than those requiring the lenses fastened at two or more points and one which is exceptionally durable under severe strain and usage.

While the mounting is herein shown and described as embodied in a preferred form of construction, it is to be understood that various modifications may be made in the shape and arrangement of its parts without departing from the spirit or scope of the invention. Therefore, without limiting ourselves in this respect, we claim:

1. A spectacle or eyeglass frame comprising a relatively flat bar of spring metal shaped to the contour of the top edges of a pair of lenses to adapt it to overlie the same in contact therewith, said bar provided with means adjacent each end for attachment to a lens at a single point adjacent the edge thereof, and a one-piece bridge-member having a portion extending parallel to the central portion of the bar for a substantial distance at the under side thereof and attached thereto, said bridge-member having end portions depending from the attached portion and adapted to support a pair of nose-pads.

2. An ophthalmic mounting comprising a substantially flat spring-bar adapted to overlie the upper edges of a pair of lenses and to be bent to conform to the contour thereof, strap members adjacent the ends of said bar for overlying the opposite faces of the lenses for attachment thereto at a single point, means for hinging temples to the bar at points adjacent the straps, and a one-piece bridge-member having a portion extending parallel to the central portion of the bar for a substantial distance at the under side thereof and attached thereto, said bridge-member having end portions depending from the attached portion and adapted to support a pair of nose-pads.

3. An ophthalmic mounting comprising a substantially flat resilient bar shaped at its ends to overlie the upper edges of a pair of lenses in contact therewith and having strap portions adjacent its ends for straddling the opposite faces of the lenses for attachment thereto at a single point, hinged joints at the ends of the bar adjacent the strap portions, temples pivoted to said hinged joints, and a one-piece bridge-member having a portion extending parallel to the central portion of the bar for a substantial distance at the under side thereof and attached thereto, said bridge-member having end portions depending from the attached portion and adapted to support a pair of nose-pads.

4. An ophthalmic mounting comprising a substantially flat resilient crossbar having its ends shaped to the contour of the edges of a pair of lenses to contact therewith and provided with strap portions adjacent its ends for straddling the opposite faces of the lenses for attachment thereto at a single point, and a bridge-member of substantially the same shape as the central portion of the bar and supported thereon in spaced relation therebelow, the ends of said bridge-member extending rearwardly and downwardly and adapted to mount a pair of nose-pads.

LLOYD H. KIRK.
CHARLES PLOUFFE.